US006468051B2

(12) United States Patent
Lampe et al.

(10) Patent No.: US 6,468,051 B2
(45) Date of Patent: Oct. 22, 2002

(54) HELICAL FLOW COMPRESSOR/TURBINE PERMANENT MAGNET MOTOR/ GENERATOR

(76) Inventors: Steven W. Lampe, 202 Ramble Ridge, Thousand Oaks, CA (US) 91360; Matthew J. Stewart, 2194 Olivewood Dr., Thousand Oaks, CA (US) 91362; Dennis H. Weissert, 10500 Sunland Grove #102, Sunland, CA (US) 91040

( * ) Notice: Subject to any disclaimer, the term of this patent is extended or adjusted under 35 U.S.C. 154(b) by 0 days.

(21) Appl. No.: 09/800,900

(22) Filed: Mar. 7, 2001

(65) Prior Publication Data

US 2001/0018026 A1 Aug. 30, 2001

Related U.S. Application Data

(63) Continuation of application No. 09/295,238, filed on Apr. 19, 1999, now abandoned.

(51) Int. Cl.[7] .......................... F04B 49/00; F16K 31/12; F01B 25/02

(52) U.S. Cl. ........................ 417/295; 415/151; 137/503

(58) Field of Search .......................... 417/295; 415/151, 415/155, 157; 137/503

(56) References Cited

U.S. PATENT DOCUMENTS

| | | | | | |
|---|---|---|---|---|---|
| 1,665,687 | A | | 4/1928 | Derrick | |
| 1,973,669 | A | | 9/1934 | Spoor | 103/96 |
| 2,220,538 | A | | 11/1940 | Niebert | 103/96 |
| 2,245,094 | A | | 6/1941 | Niebert | 103/96 |
| 2,247,335 | A | | 6/1941 | Niebert | 103/96 |
| 2,319,776 | A | | 5/1943 | Copeland et al. | 103/96 |
| 2,364,168 | A | | 12/1944 | Shallenberg | 103/33 |
| 2,724,338 | A | | 11/1955 | Roth | 103/96 |
| 2,785,634 | A | | 3/1957 | Marshall et al. | 103/5 |
| 2,842,062 | A | * | 7/1958 | Wright | 103/96 |
| 3,477,636 | A | | 11/1969 | Gessner | 230/129 |
| 3,518,021 | A | | 6/1970 | Lake et al. | 415/172 |
| 3,581,493 | A | | 6/1971 | Sweet et al. | 60/39.74 |
| 3,722,218 | A | | 3/1973 | Lapera | 60/39.74 |
| 3,782,850 | A | | 1/1974 | Egli et al. | 415/53 T |
| 3,973,865 | A | | 8/1976 | Mugele | 415/53 T |
| 4,197,051 | A | | 4/1980 | Egli et al. | 415/53 T |
| 4,212,599 | A | * | 7/1980 | Lantermann | 417/295 |
| 4,248,567 | A | | 2/1981 | Egli et al. | 415/53 T |
| 4,261,685 | A | | 4/1981 | Egli et al. | 415/53 T |
| 4,279,570 | A | | 7/1981 | Egli et al. | 415/53 T |
| 4,281,511 | A | | 8/1981 | Neale | 60/39.53 |
| 4,306,833 | A | | 12/1981 | Sixsmith et al | 415/53 T |
| 4,325,672 | A | * | 4/1982 | Sixsmith et al. | 415/53 T |
| 4,408,952 | A | | 10/1983 | Schweinfurter | 415/53 T |
| 4,466,781 | A | | 8/1984 | Kemmner et al. | 417/366 |
| 4,473,093 | A | * | 9/1984 | Hart | 137/522 |
| 4,653,979 | A | | 3/1987 | Schillinger | 415/53 T |
| 4,869,642 | A | | 9/1989 | Williamson et al. | 415/146 |
| 4,901,520 | A | | 2/1990 | Kozak et al. | 60/39.02 |
| 4,923,364 | A | | 5/1990 | Nilsen et al. | 415/55.6 |
| 4,948,344 | A | * | 8/1990 | Cygnor | 415/55.1 |
| 5,009,575 | A | | 4/1991 | Hanai et al. | 417/244 |
| 5,011,369 | A | | 4/1991 | Mine et al. | 415/55.1 |
| 5,143,511 | A | * | 9/1992 | Verneau et al. | 415/55.4 |

(List continued on next page.)

FOREIGN PATENT DOCUMENTS

| | | |
|---|---|---|
| DE | 2125042 | 11/1972 |
| EP | 0 837 224 | 4/1998 |
| EP | 0 837 231 | 4/1998 |
| FR | 2216835 | 8/1974 |
| FR | 2294114 | 7/1976 |

*Primary Examiner*—Charles G. Freay
*Assistant Examiner*—Timothy P. Solak

(57) ABSTRACT

A helical flow compressor used to supply gaseous fuel to a turbogenerator is equipped with an inlet throttling valve. The inlet throttling valve maintains the outlet pressure of the compressor at a preselected value.

8 Claims, 10 Drawing Sheets

U.S. PATENT DOCUMENTS

| | | | | | |
|---|---|---|---|---|---|
| 5,160,249 | A | | 11/1992 | Iwai et al. | 415/55.3 |
| 5,163,810 | A | | 11/1992 | Smith | 415/55.1 |
| 5,185,997 | A | | 2/1993 | Nishijima | 60/39.07 |
| 5,215,429 | A | | 6/1993 | Sun | 415/55.4 |
| 5,273,394 | A | | 12/1993 | Samuel | 415/55.1 |
| 5,281,083 | A | | 1/1994 | Ito et al. | 415/55.1 |
| 5,310,308 | A | | 5/1994 | Yu et al. | 415/55.6 |
| 5,356,272 | A | | 10/1994 | Nagata et al. | 417/366 |
| 5,411,375 | A | * | 5/1995 | Bauer | 417/295 |
| 5,449,269 | A | | 9/1995 | Frank et al. | 415/55.1 |
| 5,456,574 | A | | 10/1995 | Donnelly et al. | 415/28 |
| 5,468,119 | A | | 11/1995 | Huebel et al. | 415/55.1 |
| 5,486,087 | A | | 1/1996 | Treiber et al. | 415/55.1 |
| 5,498,124 | A | | 3/1996 | Ito et al. | 415/55.1 |
| 5,509,729 | A | | 4/1996 | Zaviska et al. | 303/113.1 |
| 5,513,950 | A | | 5/1996 | Yu | 415/55.1 |
| 5,556,175 | A | | 9/1996 | Hayakawa et al. | 303/119.2 |
| 5,579,807 | A | | 12/1996 | Kohler | 137/625.65 |
| 5,586,869 | A | | 12/1996 | Benckert et al. | 417/218 |
| 5,752,380 | A | | 5/1998 | Bosley et al. | 60/39.281 |
| 5,819,524 | A | * | 10/1998 | Bosley et al. | 60/39.465 |
| 5,899,673 | A | | 5/1999 | Bosley et al. | 417/423.14 |

* cited by examiner

HELICAL FLOW COMPRESSOR/TURBINE PERMANENT MAGNET MOTOR/ GENERATOR

This is a continuation of co-pending application. Ser. No. 09/295,238 filed Apr. 19, 1999, now abandon.

TECHNICAL FIELD

This invention relates to the general field of helical flow compressors and turbines and more particularly to an improved helical flow compressor/turbine integrated with a permanent magnet motor/generator.

BACKGROUND OF THE INVENTION

A helical flow compressor is a high-speed rotary machine that accomplishes compression by imparting a velocity head to each fluid particle as it passes through the machine's impeller blades and then converting that velocity head into a pressure head in a stator channel that functions as a vaneless diffuser. While in this respect a helical flow compressor has some characteristics in common with a centrifuigal compressor, the primary flow in a helical flow compressor is peripheral and asymmetrical, while in a centrifuigal compressor, the primary flow is radial and symmetrical. The fluid particles passing through a helical flow compressor travel around the periphery of the helical flow compressor impeller within a generally horseshoe shaped stator channel. Within this channel, the fluid particles travel along helical streamlines, the centerline of the helix coinciding with the center of the curved stator channel. This flow pattern causes each fluid particle to pass through the impeller blades or buckets many times while the fluid particles are traveling through the helical flow compressor, each time acquiring kinetic energy. After each pass through the impeller blades, the fluid particles reenter the adjacent stator channel where they convert their kinetic energy into potential energy and a resulting peripheral pressure gradient in the stator channel.

The multiple passes through the impeller blades (regenerative flow pattern) allows a helical flow compressor to produce discharge heads of up to fifteen (15) times those produced by a centrifugal compressor operating at equal tip speeds. Since the cross-sectional area of the peripheral flow in a helical flow compressor is usually smaller than the cross-sectional area of the radial flow in a centrifugal compressor, a helical flow compressor would normally operate at flows which are lower than the flows of a centrifugal compressor having an equal impeller diameter and operating at an equal tip speed. These high-head, low-flow performance characteristics of a helical flow compressor make it well suited to a number of applications where a reciprocating compressor, a rotary displacement compressor, or a low specific-speed centrifugal compressor would not be as well suited.

A helical flow compressor can be utilized as a turbine by supplying it with a high pressure working fluid, dropping fluid pressure through the machine, and extracting the resulting shaft horsepower with a generator. Hence the term "compressor/turbine" which is used throughout this application.

The flow in a helical flow compressor can be visualized as two fluid streams which first merge and then divide as they pass through the compressor. One fluid stream travels within the impeller buckets and endlessly circles the compressor. The second fluid stream enters the compressor radially through the inlet port and then moves into the horseshoe shaped stator channel which is adjacent to the impeller buckets. Here the fluids in the two streams merge and mix. The stator channel and impeller bucket streams continue to exchange fluid while the stator channel fluid stream is drawn around the compressor by the impeller motion. When the stator channel fluid stream has traveled around most of the compressor periphery, its further circular travel is blocked by the stripper plate. The stator channel fluid stream then turns radially outward and exits from the compressor through the discharge port. The remaining impeller bucket fluid stream passes through the stripper plate within the buckets and merges with the fluid just entering the compressor/turbine.

The fluid in the impeller buckets of a helical flow compressor travels around the compressor at a peripheral velocity which is essentially equal to the impeller blade velocity. It thus experiences a strong centrifugal force which tends to drive it radially outward, out of the buckets. The fluid in the adjacent stator channel travels at an average peripheral velocity of between five (5) and ninety-nine (99) percent of the impeller blade velocity, depending upon the compressor discharge flow. It thus experiences a centrifugal force which is much less than that experienced by the fluid in the impeller buckets. Since these two centrifugal forces oppose each other and are unequal, the fluid occupying the impeller buckets and the stator channel is driven into a circulating or regenerative flow. The fluid in the impeller buckets is driven radially outward and "upward" into the stator channel. The fluid in the stator channel is displaced and forced radially inward and "downward" into the impeller bucket.

The fluid in the impeller buckets of a helical flow turbine travels around the turbine at a peripheral velocity which is essentially equal to the impeller blade velocity. It thus experiences a strong centrifugal force which would like to drive it radially outward if unopposed by other forces. The fluid in the adjacent stator channel travels at an average peripheral velocity of between one hundred and one percent (101%) and two hundred percent (200%) of the impeller blade velocity, depending upon the compressor discharge flow. It thus experiences a centrifugal force which is much greater than that experienced by the fluid in the impeller buckets. Since these two centrifugal forces oppose each other and are unequal, the fluid occupying the impeller buckets and the stator channel is driven into a circulating or regenerative flow. The fluid in the impeller buckets is driven radially inward and "upward" into the stator channel. The fluid in the stator channel is displaced and forced radially outward and "downward" into the impeller bucket.

While the fluid is traveling regeneratively, it is also traveling peripherally around the stator-impeller channel. Thus, each fluid particle passing through a helical flow compressor or turbine travels along a helical streamline, the centerline of the helix coinciding with the center of the generally horseshoe shaped stator-impeller channel. While the unique capabilities of a helical flow compressor/turbine would seem to offer many applications, the low flow limitation has severely curtailed their widespread utilization.

Permanent magnet motors and generators, on the other hand, are used widely in many varied applications. This type of motor/generator has a stationary field coil and a rotatable armature of permanent magnets. In recent years, high energy product permanent magnets having significant energy increases have become available. Samarium cobalt permanent magnets having an energy product of near thirty megagauss-oersted (mgo) are now readily available and neodymium-iron-boron magnets with an energy product of over thirty megagauss-oersted are also available. Even further increases of mgo to over forty-five megagauss-oersted promise to be available soon. The use of such high energy product permanent magnets permits increasingly smaller machines capable of supplying increasingly higher power outputs.

The permanent magnet motor/generator rotor may comprise a plurality of equally spaced magnetic poles of alternating polarity or may even be a sintered one-piece magnet with radial orientation. The stator would normally include a plurality of windings and magnet poles of alternating polarity. In a generator mode, rotation of the permanent magnet motor/generator rotor causes the permanent magnets to pass by the stator poles and coils and thereby induces an electric current to flow in each of the coils. In the motor mode, electrical current is passed through the coils which will cause the permanent magnet motor/generator rotor to rotate.

An example of a helical flow compressor/turbine integrated with a permanent magnet motor/generator is described in U.S. patent application Ser. No. 08/730,946 filed Oct. 16, 1996 entitled Helical Flow Compressor/Turbine Permanent Magnet Motor/Generator, assigned to the same Assignee as this application and hereby incorporated by reference.

SUMMARY OF THE INVENTION

In the present invention, a helical flow compressor/turbine is integrated with a permanent magnet motor/generator to obtain fluid dynamic control characteristics that are otherwise not readily obtainable. The helical flow compressor/turbine permanent magnet motor/generator includes a helical flow compressor/turbine having multiple impellers mounted on a shaft rotatably supported by a pair of bearings within a compressor housing. A permanent magnet motor/generator stator is positioned around a permanent magnet motor/generator rotor disposed on the free end of the shaft supported within the compressor housing. The compressor housing includes a generally horseshoe shaped fluid flow stator channel operably associated with each row of impeller blades, a fluid inlet at one end of the generally horseshoe shaped fluid flow stator channel(s), and a fluid outlet at the other end of the generally horseshoe shaped fluid flow stator channel(s).

If operating conditions permit, the multiple impellers can be rotatably supported by a duplex pair of ball bearings at one end and a single ball bearing at the other end. If ambient operating temperatures are high, a compliant foil hydrodynamic fluid film journal bearing can be used at the high pressure (hotter) end in lieu of the single ball bearing. Still further, compliant foil hydrodynamic fluid film journal bearings can be used at both ends of the multiple impellers and a compliant foil hydrodynamic fluid film thrust bearing disposed around one of the impellers with the impeller acting as a thrust disk or around a stator channel plate and acting on opposite faces of adjacent impellers. A labyrinth seal may be utilized at the base of the impellers and a face or honeycomb seal may be used along the radial face of the impellers.

BRIEF DESCRIPTION OF THE DRAWINGS

Figure 1:
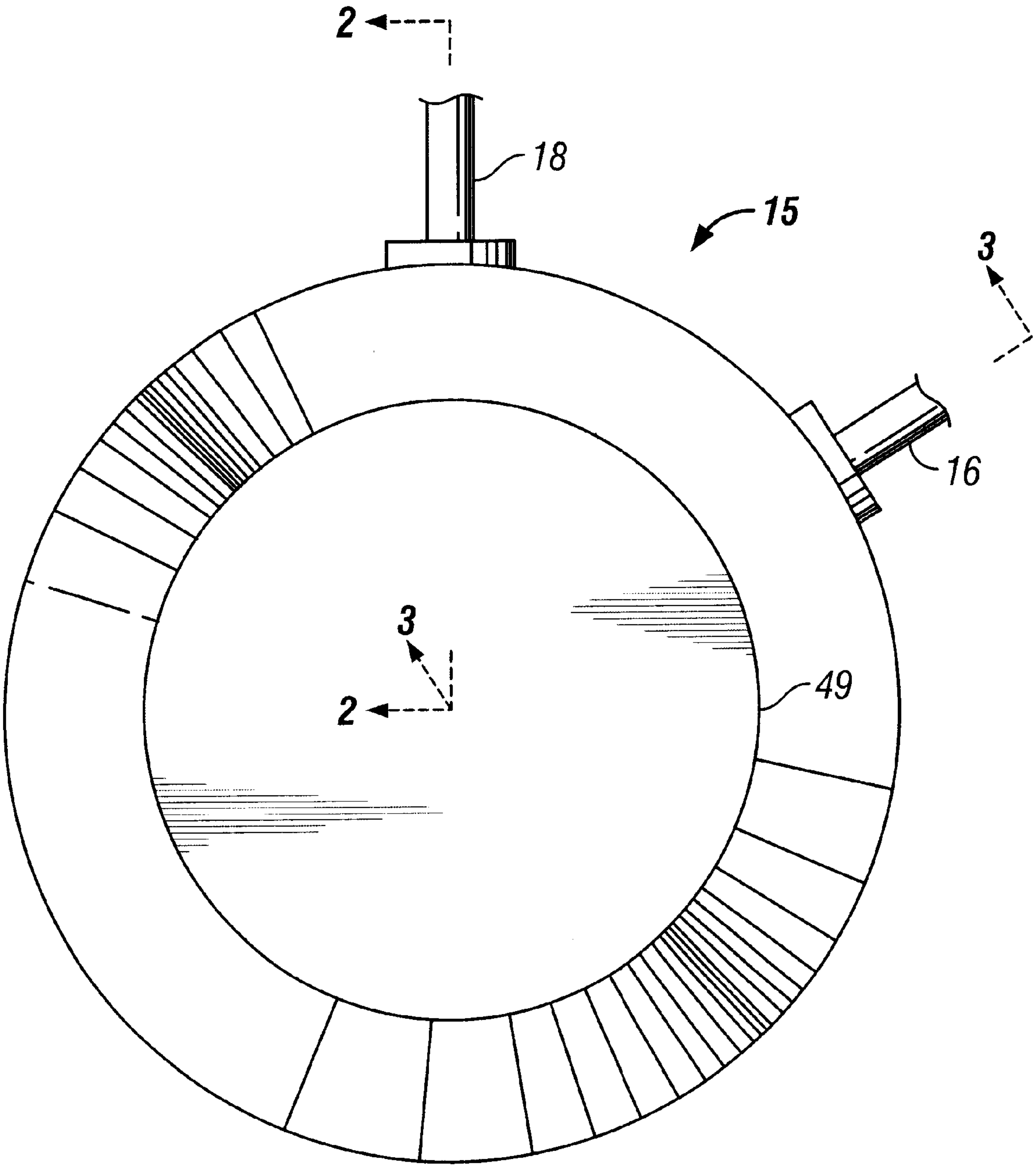
Figure 2:
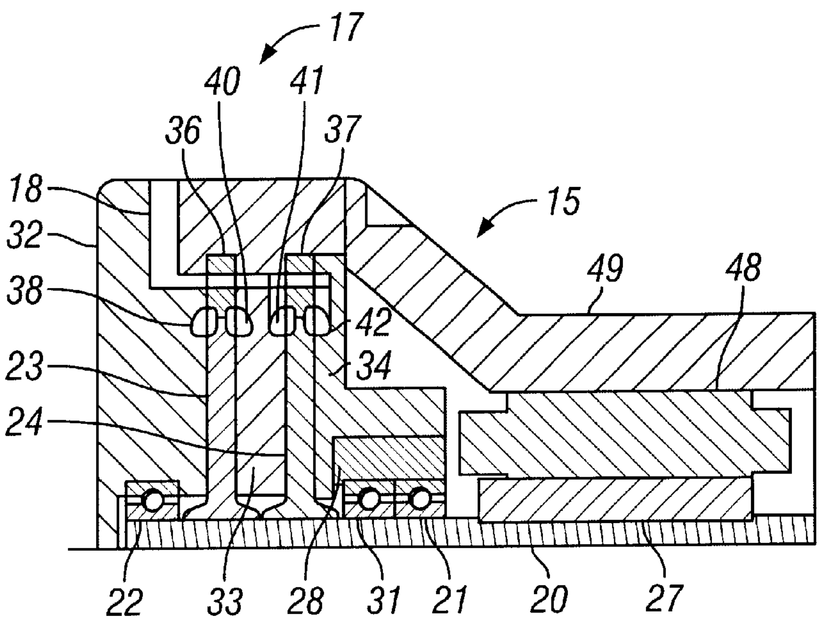
Figure 3:
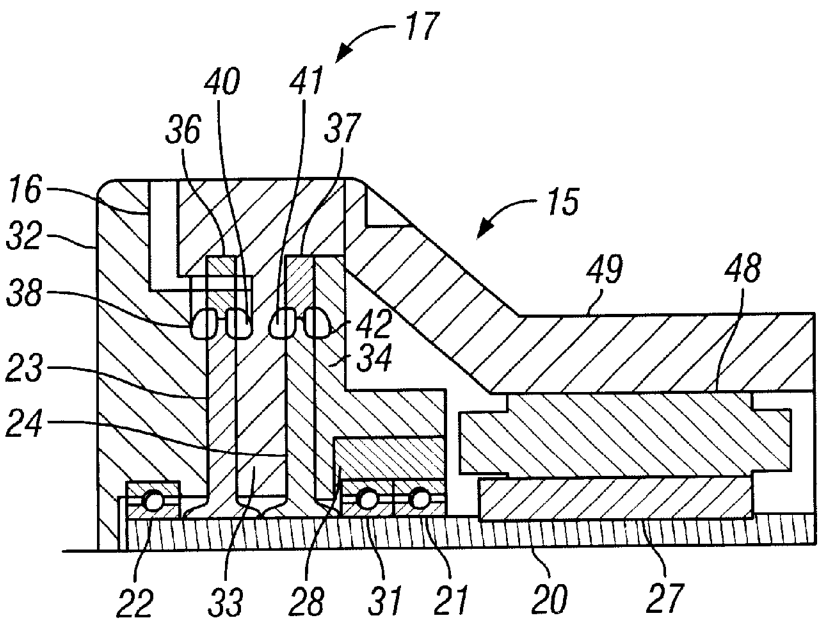
Figure 4:
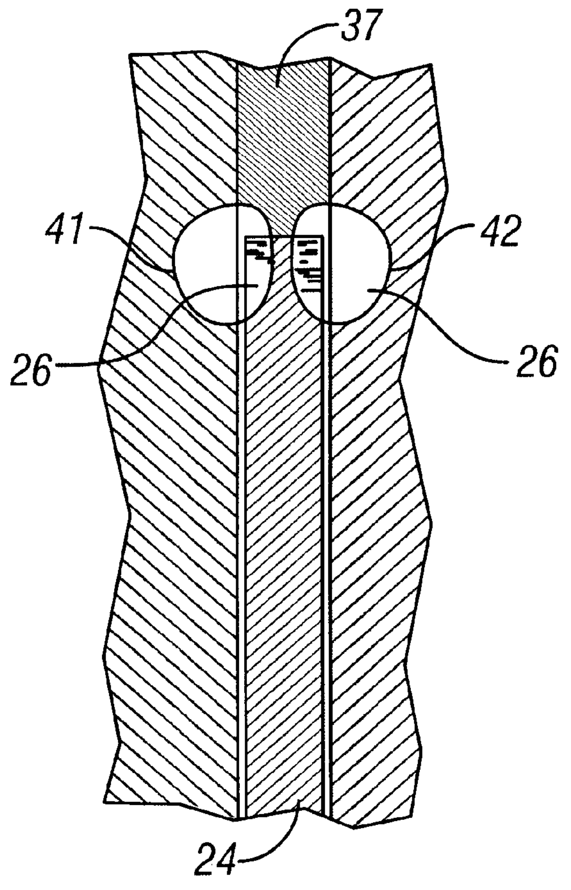
Figure 5:
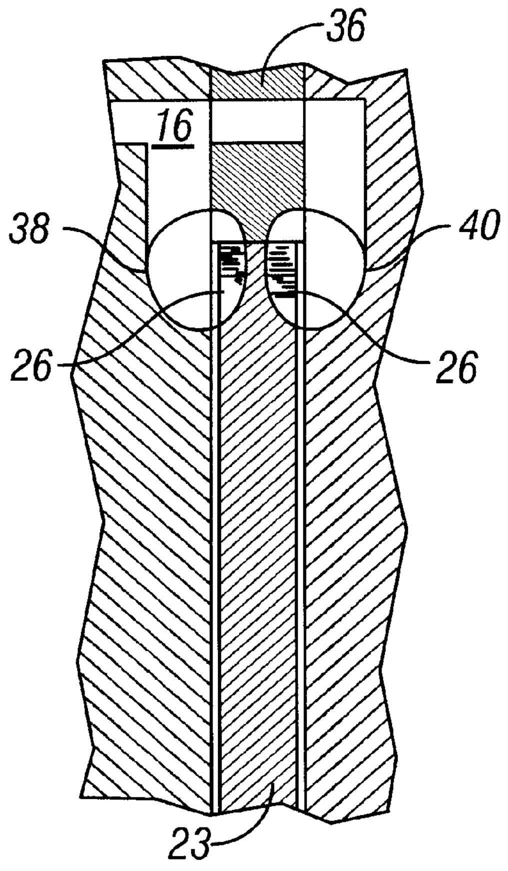
Figure 6:
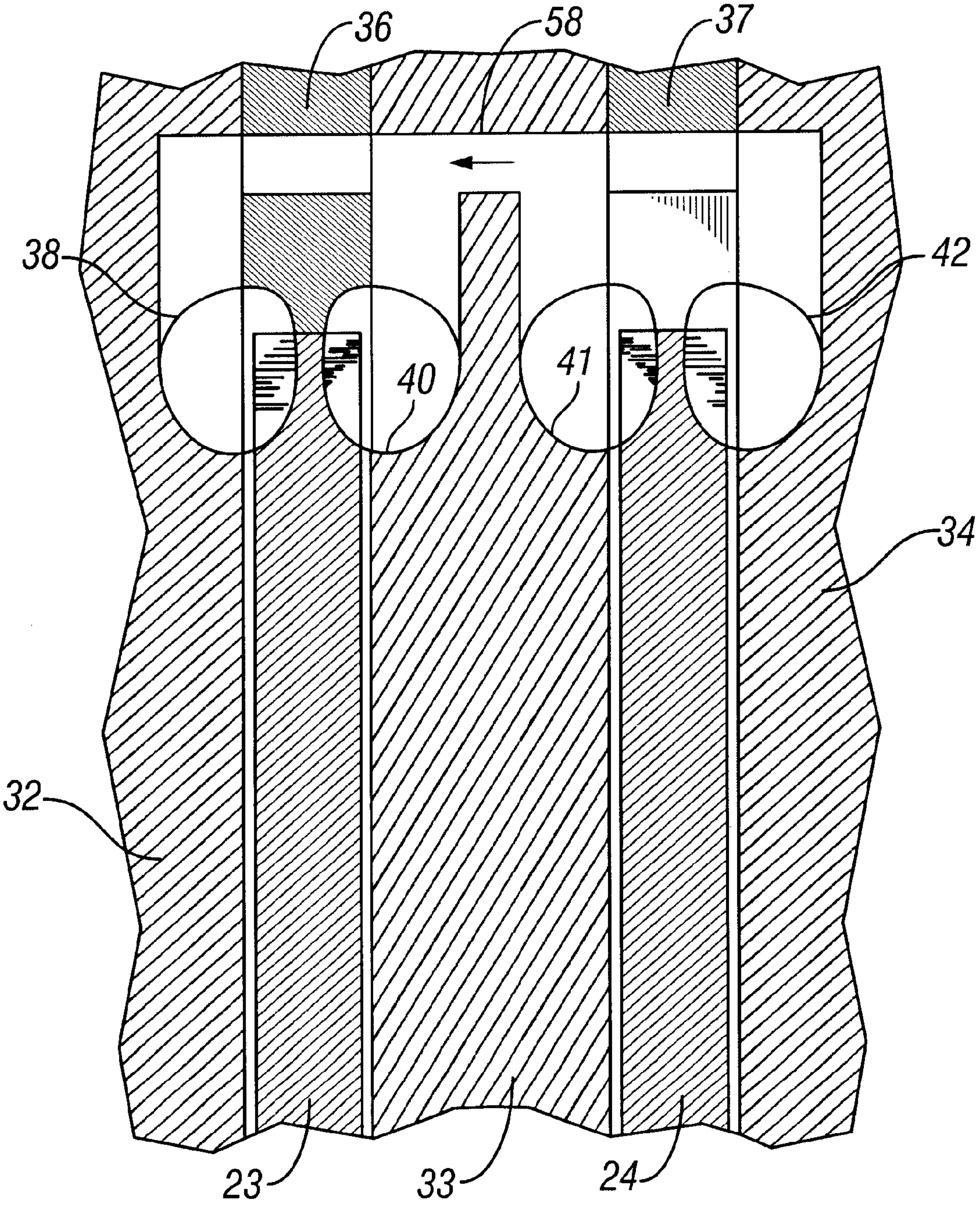
Figure 7:
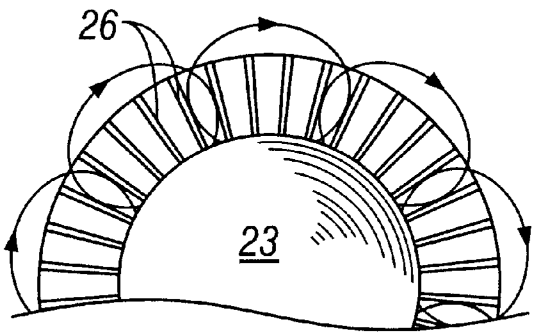
Figure 8:
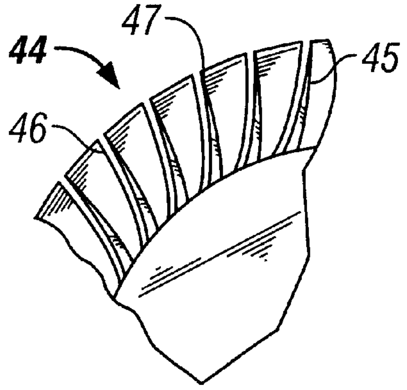
Figure 9:
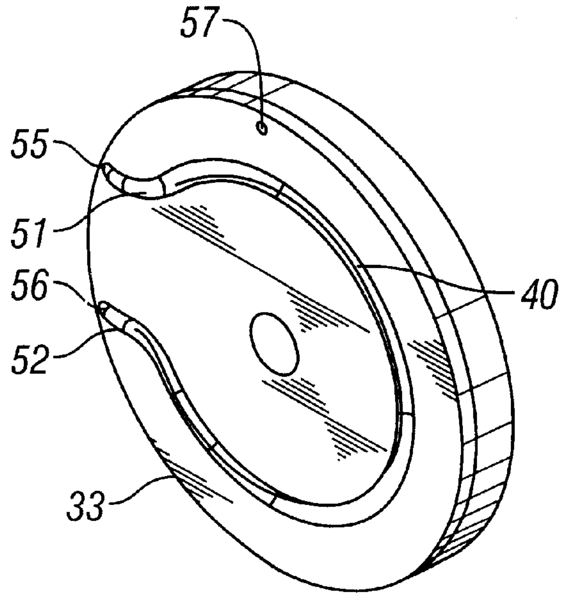
Figure 10:
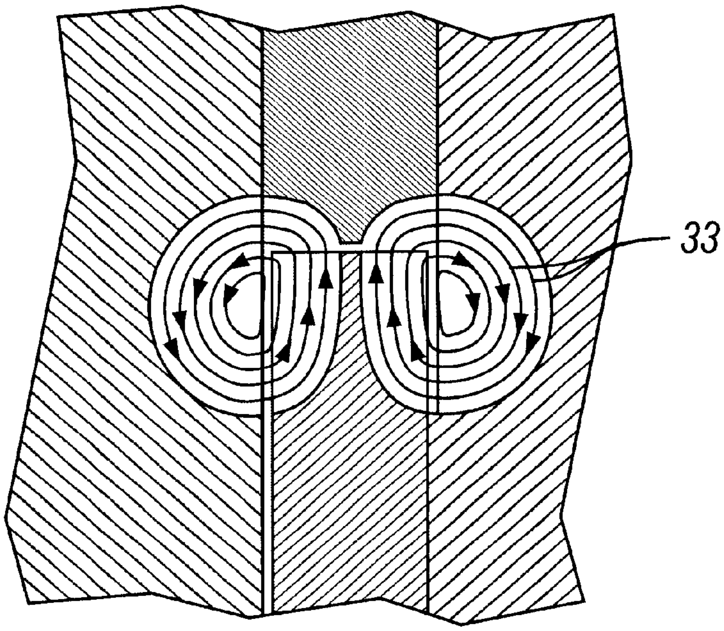
Figure 11:
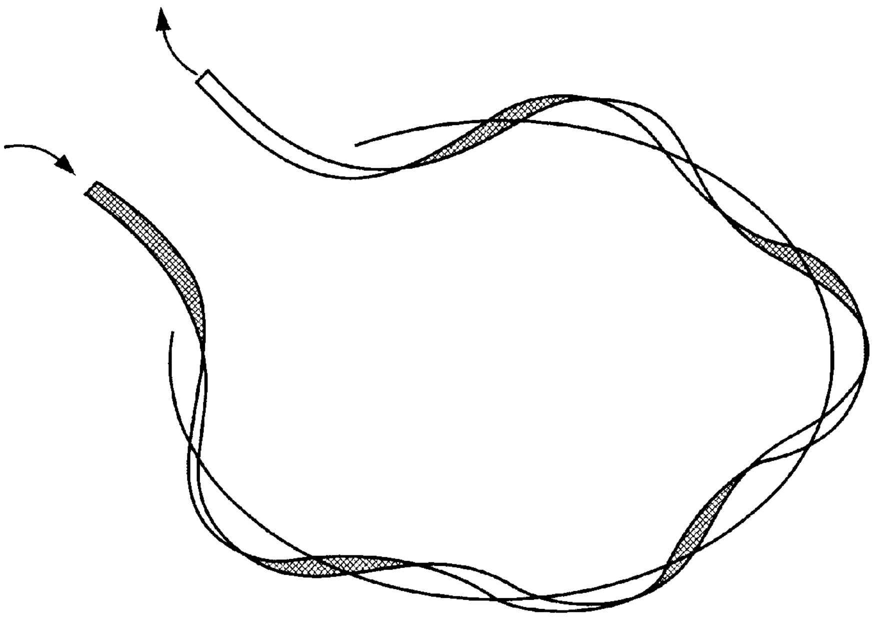
Figure 12:
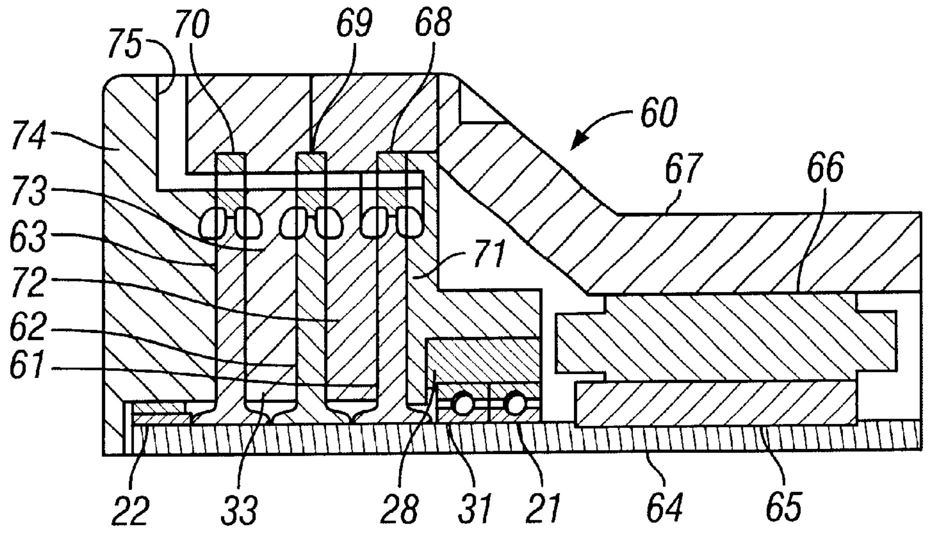
Figure 13:
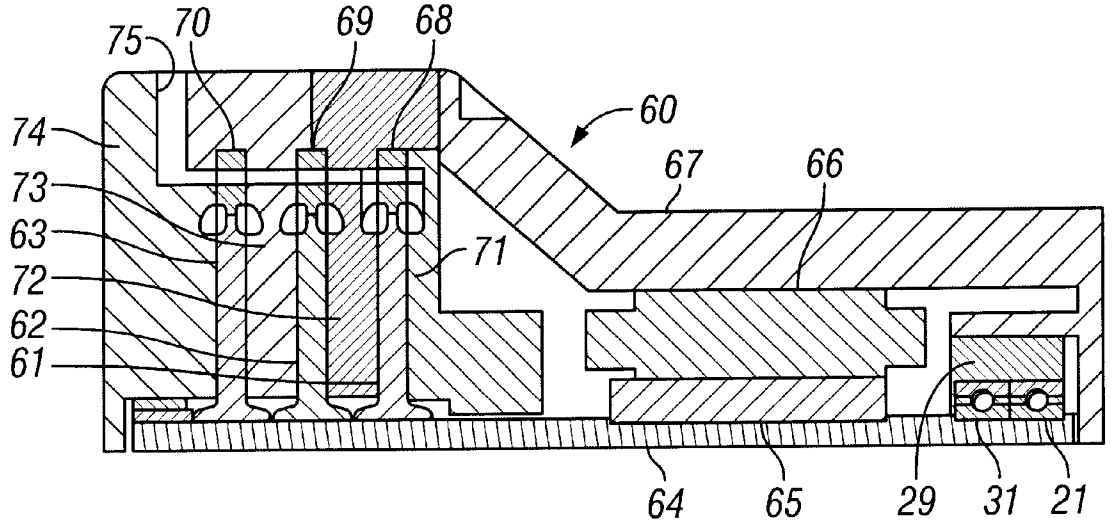
Figure 14:
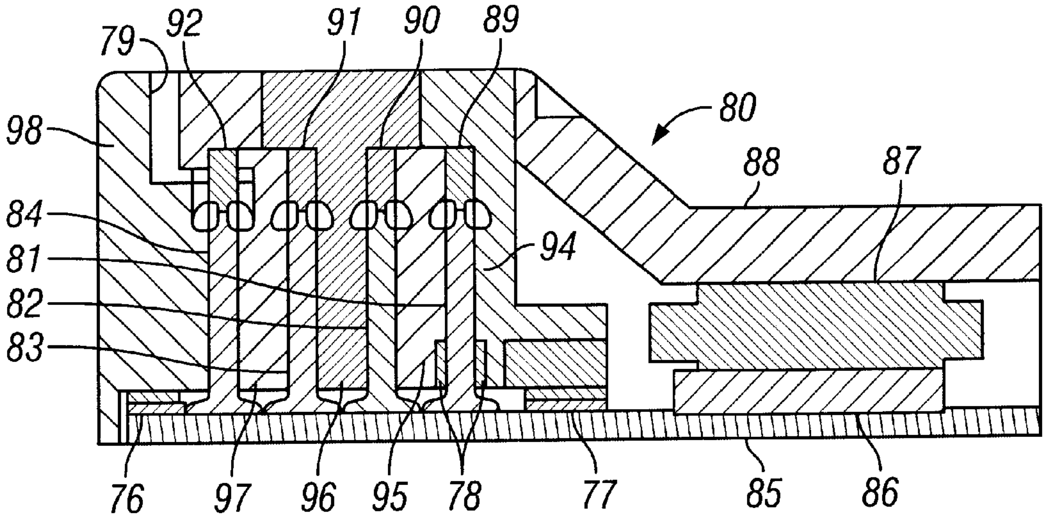
Figure 15:
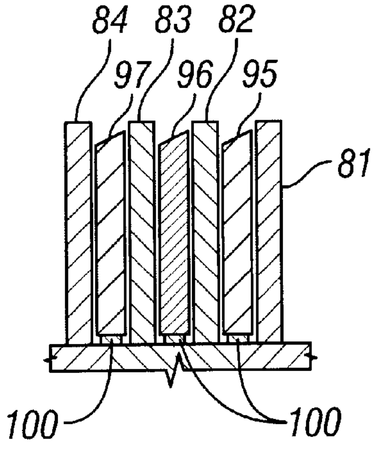
Figure 16:
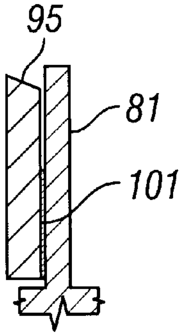
Figure 17:
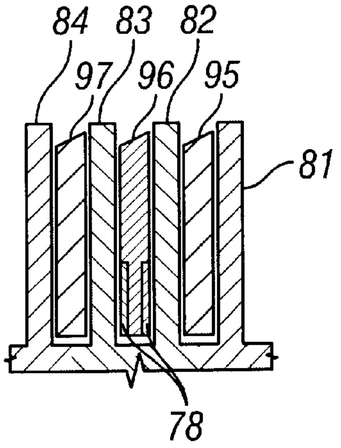
Figure 18:
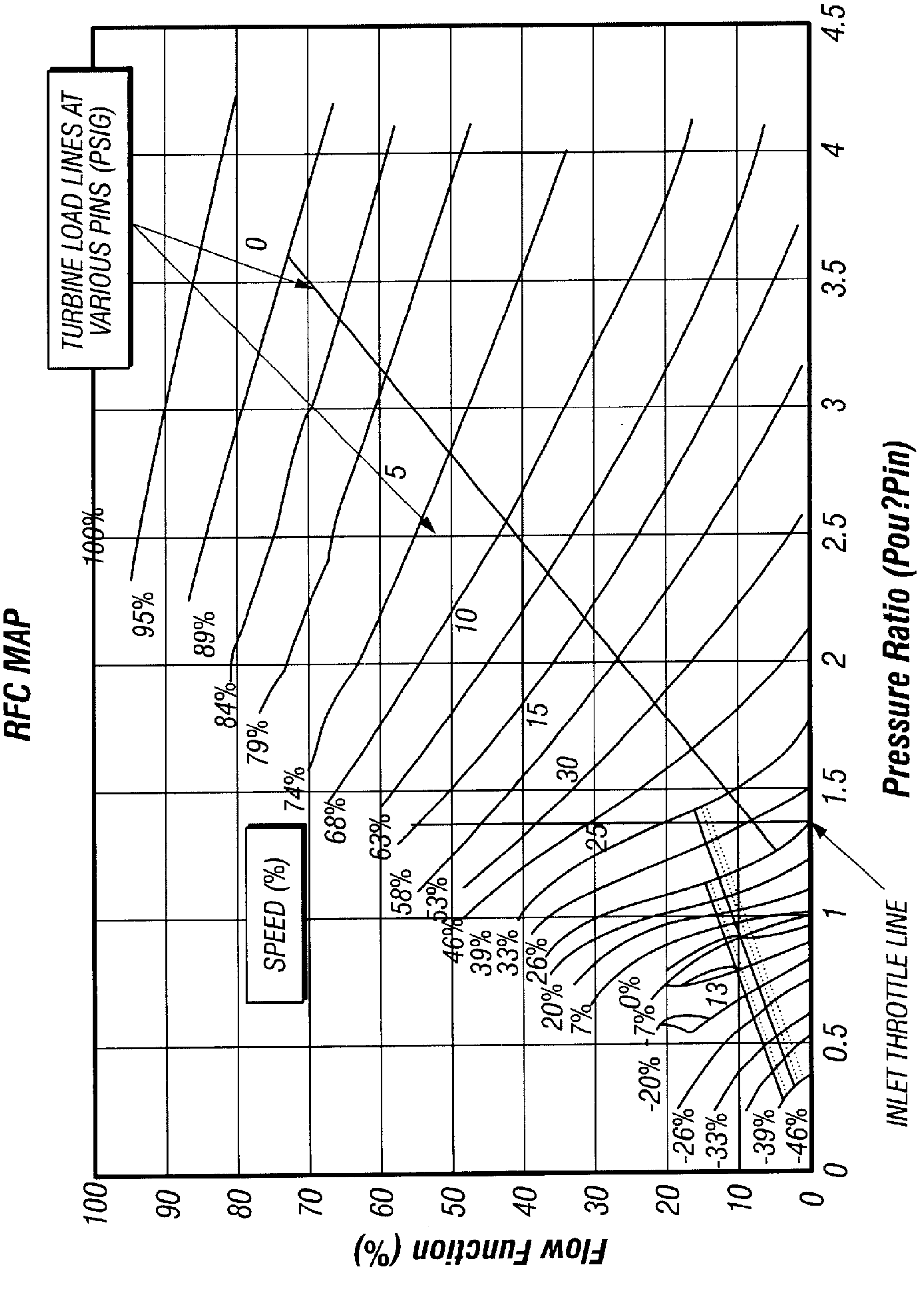
Figure 19:
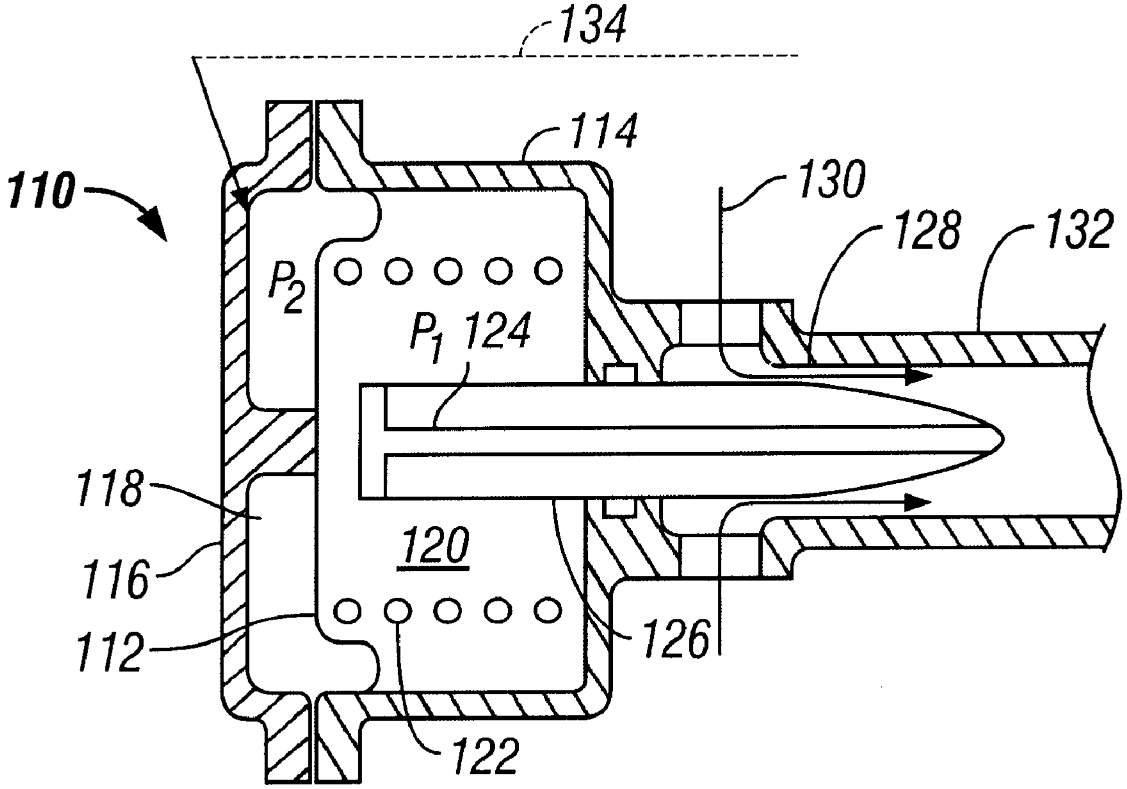

Having thus described the present invention in general terms, reference will now be made to the accompanying drawings in which:

FIG. 1 is an end view of a two stage helical flow compressor/turbine permanent magnet motor/generator of the present invention;

FIG. 2 is a cross sectional view of the helical flow compressor/turbine permanent magnet motor/generator of FIG. 1 taken along line 2—2;

FIG. 3 is a cross sectional view of the helical flow compressor/turbine permanent magnet motor/generator of FIG. 1 taken along line 3—3;

FIG. 4 is an enlarged sectional view of a portion of the low pressure stage of the helical flow compressor/turbine permanent magnet motor/generator of FIG. 3;

FIG. 5 is an enlarged sectional view of a portion of the high pressure stage of the helical flow compressor/turbine permanent magnet motor/generator of FIG. 3;

FIG. 6 is an enlarged sectional view of the helical flow compressor/turbine permanent magnet motor/generator of FIGS. 1–3 illustrating the crossover of fluid from the low pressure stage to the high pressure stage;

FIG. 7 is an enlarged partial plan view of the helical flow compressor/turbine impeller having straight radial blades and illustrating the flow of fluid therethrough;

FIG. 8 is an enlarged partial plan view of a helical flow compressor/turbine impeller having curved blades;

FIG. 9 is an exploded perspective view of a stator channel plate of the helical flow compressor/turbine permanent magnet motor/generator of FIGS. 1–5;

FIG. 10 is an enlarged sectional view of a portion of FIG. 4 illustrating fluid flow streamlines in the impeller blades and fluid flow stator channels;

FIG. 11 is a schematic representation of the flow of fluid through a helical flow compressor/turbine;

FIG. 12 is a cross sectional view of a three stage helical flow compressor/turbine permanent magnet motor/generator of the present invention;

FIG. 13 is a cross sectional view of an alternate three stage helical flow compressor/turbine permanent magnet motor/generator of the present invention;

FIG. 14 is a cross sectional view of a four stage helical flow compressor/turbine permanent magnet motor/generator of the present invention;

FIG. 15 is a cross sectional view of a portion of the four stage helical flow compressor/turbine permanent magnet motor/generator of FIG. 14 having labyrinth seals at the base of the impellers;

FIG. 16 is a cross sectional view of a portion of the four stage helical flow compressor/turbine permanent magnet motor/generator of FIG. 14 having a face or honeycomb seal along the radial face of an impeller;

FIG. 17 is a cross sectional view of a portion of the four stage helical flow compressor/turbine permanent magnet motor/generator of FIG. 14 illustrating an alternate compliant foil fluid film thrust bearing configuration;

FIG. 18 is a graphical representation of the operating conditions for a helical flow compressor/turbine permanent magnet motor/generator of the present invention; and FIG. 19 is a cross sectional view of an inlet throttle valve for the helical flow compressor/turbine permanent magnet motor/generator of the present invention.

DETAILED DESCRIPTION OF THE PREFERRED EMBODIMENTS

A two stage helical flow compressor/turbine permanent magnet motor/generator 15 is illustrated in FIGS. 1–3 and includes a fluid inlet 18 to provide fluid to the helical flow compressor/turbine 17 of the helical flow compressor/turbine permanent magnet motor/generator 15 and a fluid outlet 16 to remove fluid from the helical flow compressor/turbine 17 of the helical flow compressor/turbine permanent motor/generator 15. The helical flow machine is referred to as a compressor/turbine since it can function both as a compressor and as a turbine. The permanent magnet machine is referred to as a motor/generator since it can function equally well as a motor to produce shaft horsepower or as a generator to produce electrical power.

The helical flow compressor/turbine permanent magnet motor/generator 15 includes a shaft 20 rotatably supported by duplex ball bearings 21 and 31 at one end and single ball bearing 22 at the opposite end. The bearings are disposed on either side of low pressure stage impeller 24 and high pressure stage impeller 23 mounted at one end of the shaft 20, while permanent magnet motor/generator rotor 27 is mounted at the opposite end thereof. The duplex ball bearings 21 and 31 are held by bearing retainer 28 while single ball bearing 22 is disposed between high pressure stator channel plate 32 and the shaft 20. Both the low-pressure stage impeller 24 and high pressure stage impeller 23 include a plurality of blades 26.

Low pressure stripper plate 37 and high pressure stripper plate 36 are disposed radially outward from low pressure impeller 24 and high pressure impeller 23, respectively. The permanent magnet motor/generator rotor 27 on the shaft 20 is disposed to rotate within permanent magnet motor/ generator stator 48 which is disposed in the permanent magnet housing 49.

The low pressure impeller 24 is disposed to rotate between the low pressure stator channel plate 34 and the mid stator channel plate 33 while the high pressure impeller 23 is disposed to rotate between the mid stator channel plate 33 and the high pressure stator channel plate 32. Low pressure stripper plate 37 has a thickness slightly greater than the thickness of low pressure impeller 24 to provide a running clearance for the low pressure impeller 24 between low pressure stator channel plate 34 and mid stator channel plate 33 while high pressure stripper plate 36 has a thickness slightly greater than the thickness of high pressure impeller 23 to provide a running clearance for the high pressure impeller 23 between mid stator channel plate 33 and high pressure stator channel plate 32.

The low pressure stator channel place 34 includes a generally horseshoe shaped fluid flow stator channel 42 having an inlet to receive fluid from the fluid inlet 55. The mid stator channel plate 33 includes a low pressure generally horseshoe shaped fluid flow stator channel 41 on the low pressure side thereof and a high pressure generally horseshoe shaped fluid flow stator channel 40 on the high pressure side thereof. The low pressure generally horseshoe shaped fluid flow stator channel 41 on the low pressure side of the mid stator channel plate 33 mirrors the generally horseshoe shaped fluid flow stator channel 42 in the low pressure stator channel plate 34. The high pressure stator channel plate 32 includes a generally horseshoe shaped fluid flow stator channel 38 which minors the high pressure generally horseshoe shaped fluid flow stator channel 40 on the high pressure side of mid stator channel plate 33.

Each of the stator channels includes an inlet and an outlet disposed radially outward from the channel. The inlets and outlets of the low pressure stator channel plate generally horseshoe shaped fluid flow stator channel 42 and mid helical flow stator channel plate low pressure generally horseshoe shaped fluid flow stator channel 41 are axially aligned as are the inlets and outlets of mid helical flow stator channel plate high pressure generally horseshoe shaped fluid flow stator channel 40 and high pressure stator channel plate generally horseshoe shaped fluid flow stator channel 38.

The fluid inlet 18 extends through the high pressure stator channel plate 32, high pressure stripper plate 36, and mid stator channel plate 33 to the inlets of both of low pressure stator channel plate generally horseshoe shaped fluid flow stator channel 42 and mid helical flow stator channel plate low pressure generally horseshoe shaped fluid flow stator channel 41. The fluid outlet 16 extends from the outlets of both the mid helical flow stator channel plate high pressure generally horseshoe shaped fluid flow stator channel 40 and high pressure stator channel plate generally horseshoe shaped fluid flow stator channel 38, through the high pressure stripper plate 36, and through the high pressure stator channel plate 32.

The crossover from the low pressure compression stage to the high pressure compression stage is illustrated in FIG. 6. Both of the outlets from the low pressure stator 5 channel plate generally horseshoe shaped fluid flow stator channel 42 and mid helical flow stator channel plate low pressure generally horseshoe shaped fluid flow stator channel 41 provide partially compressed fluid to the crossover 58 which in turn provides the partially compressed fluid to both inlets of mid helical flow stator channel plate high pressure generally horseshoe shaped fluid flow stator channel 40 and high pressure stator channel plate generally horseshoe shaped fluid flow stator channel 38.

The impeller blades or buckets are best illustrated in FIGS. 7 and 8. The radial outward edge of the impeller 23 includes a plurality of low pressure blades 26. While these blades 28 may be radially straight as shown in FIG. 7, there may be specific applications and/or operating conditions where curved blades may be more appropriate or required.

FIG. 8 illustrates a portion of a helical flow compressor/ turbine impeller having a plurality of curved blades 44. The curved blade base or root 45 has less of a curve than the leading edge 46 thereof The curved blade tip 47, at both the root 45 and leading edge 46 would be generally radial.

The fluid flow stator channels are best illustrated in FIG. 9 which shows the mid 20 stator channel plate 33. The generally horseshoe shaped stator channel 40 is shown along with inlet 55 and outlet 56. The inlet 55 and outlet 56 would normally be displaced approximately thirty (30) degrees. Outlet 56 connects with crossover 58. An alignment or locator hole 57 is provided in each of the low pressure stator channel plate 34, the mid stator channel plate 33 and the high pressure stator channel plate 32 as well as stripper plates 37 and 36. The inlet 55 is connected to the generally horseshoe shaped stator channel 40 by a converging nozzle passage 51 that converts fluid pressure energy into fluid velocity energy. Likewise, the other end of the generally horseshoe shaped stator channel 40 is connected to the outlet 56 by a diverging diffuser passage 52 that converts fluid velocity energy into fluid pressure energy.

The depth and cross-sectional flow area of fluid flow stator channel 40 are tapered preferably so that the peripheral flow velocity need not vary as fluid pressure and density vary along the fluid flow stator channel. When compressing, the depth of the fluid flow stator channel 40 decreases from inlet to outlet as the pressure and density increases. Converging nozzle passage 51 and diverging diffuser passage 52 allow efficient conversion of fluid pressure energy into fluid velocity energy and vice versa.

FIG. 10 shows the flow through the impeller blades and the fluid flow stator channels by means of streamlines 43. On the other hand, FIG. 11 schematically illustrates the helical flow around the centerline of the impeller and fluid flow stator channel. The turning of the flow is illustrated by the alternating solid and open flow pattern lines in FIG. 11.

In a helical flow compressor/turbine, fluid enters, the inlet port 18, is accelerated as it passes through the converging nozzle passage 51, is split into two (2) flow paths by stripper plate 37, then enters the end of the generally horseshoe shaped fluid flow stator channels 41 and 42 axially adjacent to the low pressure impeller blades 26. The fluid is then directed radially inward to the root of the impeller blades 26 by a pressure gradient, accelerated through and out of the blades 26 by centrifugal force, from where it reenters the fluid flow stator channel. During this time the fluid has been traveling tangentially around the periphery of the helical flow compressor/turbine. As a result of this, a helical flow is established as best shown in FIGS. 7, 10, and 11.

While the duplex ball bearings 21 and 31 are illustrated on the permanent magnet motor/generator end of the helical flow compressor/turbine and the single ball bearing 22 is illustrated at the opposite end of the helical flow compressor/turbine, their positions can readily be reversed with the single ball bearings 22 at the permanent magnet motor/generator end of the helical flow compressor/turbine and the duplex ball bearings 21 and 31 at the opposite end of the helical flow compressor/turbine. Likewise, as will become more apparent later, while the low pressure impeller 24 is shown at the permanent magnet motor/generator end of the helical flow compressor/turbine and the high pressure impeller 23 at the opposite end, their relative positions can also be readily reversed.

A three (3) stage helical flow compressor/turbine permanent magnet motor/generator 60 is illustrated in FIG. 12 and is in all respects generally similar to the two (2) stage machine except for the addition of a third impeller and items associated with the third impeller. Likewise, FIG. 14 illustrates a four (4) stage helical flow compressor/turbine permanent magnet motor/generator 80.

The three (3) stage helical flow compressor/turbine permanent magnet motor/generator 60 of FIG. 12 includes low pressure stage impeller 61, medium pressure stage impeller 62, and high pressure stage impeller 63 all mounted at one end of the shaft 64, while permanent magnet motor/generator rotor 65 is mounted at the opposite end thereof The permanent magnet motor/generator rotor 65 on the shaft 64 is disposed to rotate within permanent magnet motor/generator stator 66 that is disposed in the permanent magnet stator housing 67. An inlet 75 is provided to the three (3) stage helical flow compressor/turbine permanent magnet motor/generator 60.

The duplex ball bearings 21 and 31 are illustrated at the low pressure side of the helical flow compressor/turbine since this side will have a lower operating temperature than the high pressure side where the compliant foil hydrodynamic fluid film journal bearing is utilized. While ball bearings are suitable for many operating conditions of the helical flow compressor/turbine permanent magnet motor/generator, compliant foil hydrodynamic fluid film journal bearings are better suited for higher temperature operation. At higher ambient operating temperature, the expected operating life of a ball bearing may not be sufficient.

Low pressure stripper plate 68, medium pressure stripper plate 69, and high pressure stripper plate 70 are disposed radially outward from low pressure impeller 61, medium pressure impeller 62, and high pressure impeller 63, respectively. The low pressure impeller 61 is disposed to rotate between the low pressure stator channel plate 71 and the first mid stator channel plate 72; the medium pressure impeller 62 is disposed to rotate between the first mid pressure stator channel plate 72 and the second mid pressure stator channel plate 73; while the high pressure impeller 63 is disposed to rotate between the second mid stator channel plate 73 and the high pressure stator channel plate 74. Low pressure stripper plate 68 has a thickness slightly greater than the thickness of low pressure impeller 61 to provide a running clearance for the low pressure impeller 61 between low pressure stator channel plate 71 and the first mid stator channel plate 72; medium pressure stripper plate 69 has a thickness slightly greater than the thickness of medium pressure impeller 62 to provide a running clearance for the medium pressure impeller 62 between the first mid stator channel plate 72 and the second mid stator channel plate 73; while high pressure stripper plate 70 has a thickness slightly greater than the thickness of high pressure impeller 63 to provide a running clearance for the high pressure impeller 63 between the second mid stator channel plate 73 and high pressure stator channel plate 74.

Generally horseshoe shaped fluid flow stator channels are disposed on either side of the low pressure impeller 61, the medium pressure impeller 62 and the high pressure impeller 63. Each of the fluid flow stator channels includes an inlet and an outlet disposed radially outward from the channel.

The crossover from the low pressure compression stage to the medium pressure stage and from the medium pressure compression stage to the high pressure compression stage would be as described with respect to the crossover between the low pressure stage to the high pressure stage in the two (2) stage helical flow compressor/turbine permanent magnet motor/generator.

An alternate three (3) stage helical flow compressor/turbine permanent magnet motor/generator 60 is illustrated in FIG. 13. In this embodiment, the duplex ball bearings 21 and 31 are disposed at the permanent magnet motor/generator end of the shaft 64 and are positioned by a bearing retainer 29 within the permanent magnet stator housing 67. Positioning the duplex bearings 21 and 31 at the end of the shaft 64 permits their operation in a much cooler environment.

The four (4) stage helical flow compressor/turbine permanent magnet motor/generator 20 80 of FIG. 14, having inlet 79, includes low pressure stage impeller 84, mid low pressure stage impeller 83, mid high pressure stage impeller 82 and high pressure stage impeller 81, all mounted at one end of the shaft 85 and each including a plurality of blades. Permanent magnet motor/generator rotor 86 is mounted at the opposite end of the shaft 85 and is disposed to rotate within permanent magnet motor/generator stator 87 which is disposed in the permanent magnet housing 88.

Low pressure stripper plate 92, mid low pressure stripper plate 91, mid high pressure stripper plate 90, and high pressure stripper plate 89 are disposed radially outward from low pressure impeller 84, mid low pressure impeller 83, mid high pressure impeller 82, and high pressure impeller 81, respectively. The low pressure impeller 84 is disposed to rotate between the low pressure stator channel plate 98 and the mid low pressure stator channel plate 97; the mid low pressure impeller 83 is disposed to rotate between the mid low pressure stator channel plate 95 and the middle stator channel plate 96; the mid high pressure impeller 82 is disposed to rotate between the middle stator channel plate 96 and the mid high pressure stator channel plate 97; while the high pressure impeller 81 is disposed to rotate between the mid high pressure stator channel plate 95 and the high pressure stator channel plate 94.

It should be noted that the high pressure impeller 81 of the four (4) stage helical flow compressor/turbine permanent magnet motor/generator 80 is disposed at the permanent magnet motor/generator end of the helical flow compressor/ turbine. Compliant foil hydrodynamic fluid film journal bearings 76 and 77 are disposed at either end of the impellers 84, 83, 82, and 81 and the radial face of one of the impellers, illustrated as low pressure impeller 81, serves as the thrust disk for double sided compliant foil hydrodynamic fluid film a thrust bearing 78.

Generally horseshoe shaped fluid flow stator channels are disposed on either side of the low pressure impeller 81, the mid low pressure impeller 83, the mid high pressure impeller 82 and the high pressure impeller 84 which each include a plurality of blades. Each of the fluid flow stator channels include an inlet and an outlet disposed radially outward from the channel and the crossover from one compression stage to the next compression stage is as described with respect to the crossover between the low pressure stage to the high pressure stage in the two (2) stage helical flow compressor/turbine permanent magnet motor/generator.

In order to prevent leakage of fluid between the impellers, labyrinth seals 100 can be disposed between adjacent impellers 81 and 82, 82 and 83, and 83 and 84 at the base of the stator channel plates 95, 96, and 97 respectively, as illustrated in FIG. 15. FIG. 16 illustrates a face or honeycomb seal 101 between an impeller 81 and stator channel plate 95, for example.

An alternate double sided compliant foil hydrodynamic fluid film thrust bearing arrangement is illustrated in FIG. 17. Instead of the double sided compliant foil hydrodynamic fluid film thrust bearing positioned on either side of an impeller as shown in FIG. 14, the arrangement in FIG. 17 shows the double sided compliant foil hydrodynamic fluid film thrust bearing 78 positioned on either side of the middle stator channel plate 96 with one side facing the mid low pressure impeller 83 and the other side facing the mid high pressure impeller 82.

One particular application to which the helical flow compressor/turbine permanent magnet motor/generator is particularly well suited is to provide gaseous fuel to a turbogenerator. In order to start the turbogenerator, the helical flow compressor/turbine permanent magnet motor/generator may need to be run backwards as a turbine in order to reduce the upstream pressure of the gaseous fuel (typically supplied from a natural gas pipeline). The gaseous fuel header pressure has to be extremely low for ignition.

As the turbogenerator speed increases, the turbogenerator's compressor discharge pressure will increase and the gaseous fuel pressure in the header that feeds the combustor nozzle injectors needs to be maintained above the turbogenerator compressor discharge pressure. For example, if a natural gas pipeline pressure is twenty (20) psi gauge when you want to light-off the turbogenerator, the natural gas pressure will have to be reduced by about nineteen (19) psi when the turbogenerator is turning at low ignition speed. As the turbogenerator speed increases after ignition, the pressure that goes into the header can be increased, that is, the pressure needs to be reduced less. Ignition typically will occur while the helical flow compressor/turbine permanent magnet motor/generator is still turning backwards and reducing pressure.

In this type of application, the shaft bearings would normally need to operate in both a clockwise and a counterclockwise direction. For ball bearings this is no problem whatsoever. However, at the high pressure impeller end of the shaft, the temperatures maybe too great for a ball bearing to survive for any extended period of time, particularly if the ambient operating temperature is high. For higher temperatures, compliant foil hydrodynamic fluid film journal bearings can be utilized for longer life.

While a compliant foil hydrodynamic fluid film journal bearing is generally designed to operate in only one direction, there are such bearings that will run in both directions. An example of such a bearing is described in U.S. patent application No. 08/002,690 filed Jan. 5, 1998 entitled "Compliant Foil Fluid Film Radial Bearing" assigned to the same Assignee as this application and incorporated herein by reference.

Alternately, if it is desired to prevent rotation of the shaft in both directions, it is possible to provide an inlet throttle valve to prevent the helical flow compressor/turbine from operating as a turbine. A graphical representation of the operating conditions for a helical flow compressor/turbine is illustrated in FIG. 18, a plot of flow function percentage on the vertical axis versus compressor pressure ratio on the horizontal axis. Speed percentage lines from minus 46% (running as a turbine) to plus 100% (running as a compressor) are shown. Turbine load lines for various inlet pressures are also shown.

The inlet throttle valve 110 is schematically shown in cross section in FIG. 19. The valve 110 includes diaphragm 112 disposed within a valve housing 114 having an end cap 116 at one end. The diaphragm 112 divides the interior of the housing into a compressor outlet pressure ($P_2$) chamber 118 and a compressor inlet pressure ($P_1$) chamber 120. A spring 122 biases the diaphragm 112 towards the compressor outlet pressure chamber 120. The compressor inlet pressure ($P_1$) is bled through the orifices 124 in the metering rod 126. The differential pressure, namely the difference between $P_1$ and $P_2$, positions the metering rod 126 within the valve housing throat 128 which controls the flow of gaseous fuel 130 into the helical flow compressor inlet 132. The compressor outlet pressure $P_2$ is fed to chamber 118 via line 134.

The valve 110 regulates the inlet flow to the helical flow compressor/turbine to maintain a minimum delta pressure across the helical flow compressor/turbine. When the pressure rise across the helical flow compressor/turbine is large, the throttle valve 100 will be wide open and not restrict the inlet pressure at all. When, however, the inlet pressure $P_1$ is greater than the outlet pressure $P_2$, the throttle valve 110 will regulate the inlet pressure $P_1$ to the helical flow compressor/turbine to a value of 3 psig less than the outlet pressure $P_2$. This forces the helical flow compressor/turbine to always operate in the area to the right of the Inlet Throttle line on FIG. 19. Operating to the right of the Inlet Throttle line insures that the helical flow compressor/turbine will always operate as a compressor and never operate as a turbine, which means that the shaft will only rotate in a single direction. Alternately, a switching solenoid valve or a proportional valve can be utilized.

Positioning the pair of journal bearings around the multiple impellers of the helical flow compressor/turbine improves the shaft dynamics of the helical flow compressor/turbine permanent magnet motor/generator. While the ball or roller bearings are suitable for many applications, the higher temperature capability of compliant foil fluid film bearings can be used at the high pressure or hotter end of the helical flow compressor/turbine or at both ends of the helical flow compressor/turbine. This can greatly increase bearing life in high temperature operating environments. The thrust load can be taken by a compliant foil fluid film thrust bearing using one of the impellers as a thrust disk. With compliant foil fluid film bearings, an inlet throttle valve can be used to insure rotation in a single direction.

While specific embodiments of the invention have been illustrated and described, it is to be understood that these are provided by way of example only and that the invention is not to be construed as being limited thereto but only by the proper scope of the following claims.

What we claim is:

1. A helical flow compressor for providing gaseous fuel to a turbogenerator, comprising:

a shaft;

one or more impellers disposed on the shaft;

an electric motor connected to the shaft to rotate the one or more impellers in a forward direction;

a gaseous fuel inlet to receive fuel at an inlet pressure;

a gaseous fuel outlet to discharge the fuel at a selected outlet pressure; and an inlet throttle means connected to the inlet to control the inlet pressure to a value less than the selected outlet pressure.

2. The compressor of claim 1, wherein the inlet throttle means comprises:

an inlet throttle means to reduce the inlet pressure to a selected inlet pressure when the inlet pressure is greater than the selected outlet pressure.

3. The compressor of claim 2, wherein the inlet throttle means comprises:

an inlet throttle means to reduce the inlet pressure to a value of approximately 3 psig less than the selected outlet pressure when the inlet pressure is greater than the selected outlet pressure.

4. The compressor of claim 1, wherein the inlet throttle. means comprises:

an inlet throttle means to reduce the inlet pressure to a preselected value below the outlet pressure when the inlet pressure is greater than the selected outlet pressure.

5. A method of supplying gaseous fuel to a turbogenerator, comprising:

selecting an outlet pressure for supplying the fuel to the turbogenerator;

supplying the fuel to a helical flow compressor;

controlling the pressure of the fuel supply to a value less than the selected outlet pressure by modulating a throttling means fluidly disposed between the fuel supply and the compressor; and rotating the compressor in a forward direction to compress the fuel to the selected outlet pressure.

6. The method of claim 5, wherein controlling the supply pressure comprises:

reducing the supply pressure to a selected supply pressure when the supply pressure is greater than the selected outlet pressure.

7. The method of claim 6, wherein reducing the supply pressure comprises:

reducing the supply pressure to a value of approximately 3 psig less than the selected outlet pressure when the supply pressure is greater than the selected outlet pressure.

8. The method of claim 5, wherein controlling the supply pressure comprises:

reducing the supply pressure to a preselected value below the outlet pressure when the supply pressure is greater than the selected outlet pressure.

* * * * *